(12) United States Patent
Bares et al.

(10) Patent No.: US 6,938,401 B2
(45) Date of Patent: Sep. 6, 2005

(54) SEPARATION HOOD FOR A COTTON HARVESTER

(75) Inventors: Robert Matthew Bares, Johnston, IA (US); Jeffrey Robert Fox, Minburn, IA (US); Michael Lee Pearson, Ankeny, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/695,095

(22) Filed: Oct. 28, 2003

(65) Prior Publication Data

US 2005/0086922 A1 Apr. 28, 2005

(51) Int. Cl.[7] .............................................. A01D 46/10
(52) U.S. Cl. ........................................ 56/13.1; 56/30
(58) Field of Search ........................ 56/341, 28, 13.1, 56/30

(56) References Cited

U.S. PATENT DOCUMENTS

| | | | |
|---|---|---|---|
| 2,741,888 A | 4/1956 | Hamel et al. ................ | 56/13.1 |
| 3,466,857 A | * 9/1969 | Gaul et al. .................... | 56/30 |
| 4,606,177 A | 8/1986 | Schlueter ...................... | 56/30 |
| 5,042,237 A | 8/1991 | Sanderson .................... | 56/10.2 |
| 5,499,491 A | * 3/1996 | Deutsch et al. ............. | 56/10.2 H |
| 6,263,650 B1 | 7/2001 | Deutsch et al. ............. | 56/16.4 |
| 6,421,996 B1 | 7/2002 | Deutsch et al. ............. | 56/341 |

* cited by examiner

Primary Examiner—Meredith Petravick

(57) ABSTRACT

A hood receives a stream of material including a mix of cotton, air and debris from an air delivery system on a cotton harvester. A forward deflector directs the mixture towards the rear of an accumulator. The deflected mixture passes under finger grates which retains cotton but allows some of the air and light trash to pass through out of the stream. A curved rear deflector forces the remaining mix downwardly towards the accumulator and prevents build-up on receptacle walls. Air and light debris change direction abruptly at the bottom of the rear deflector and exit through an inlet area and upwardly directed path at the back of the deflector. The momentum of the heavier cotton prevents cotton from making the tight turn around the bottom of the deflector and directs the cotton towards the receptacle or accumulator. The inlet area can be adjusted or closed completely to prevent cotton loss in certain conditions.

16 Claims, 5 Drawing Sheets

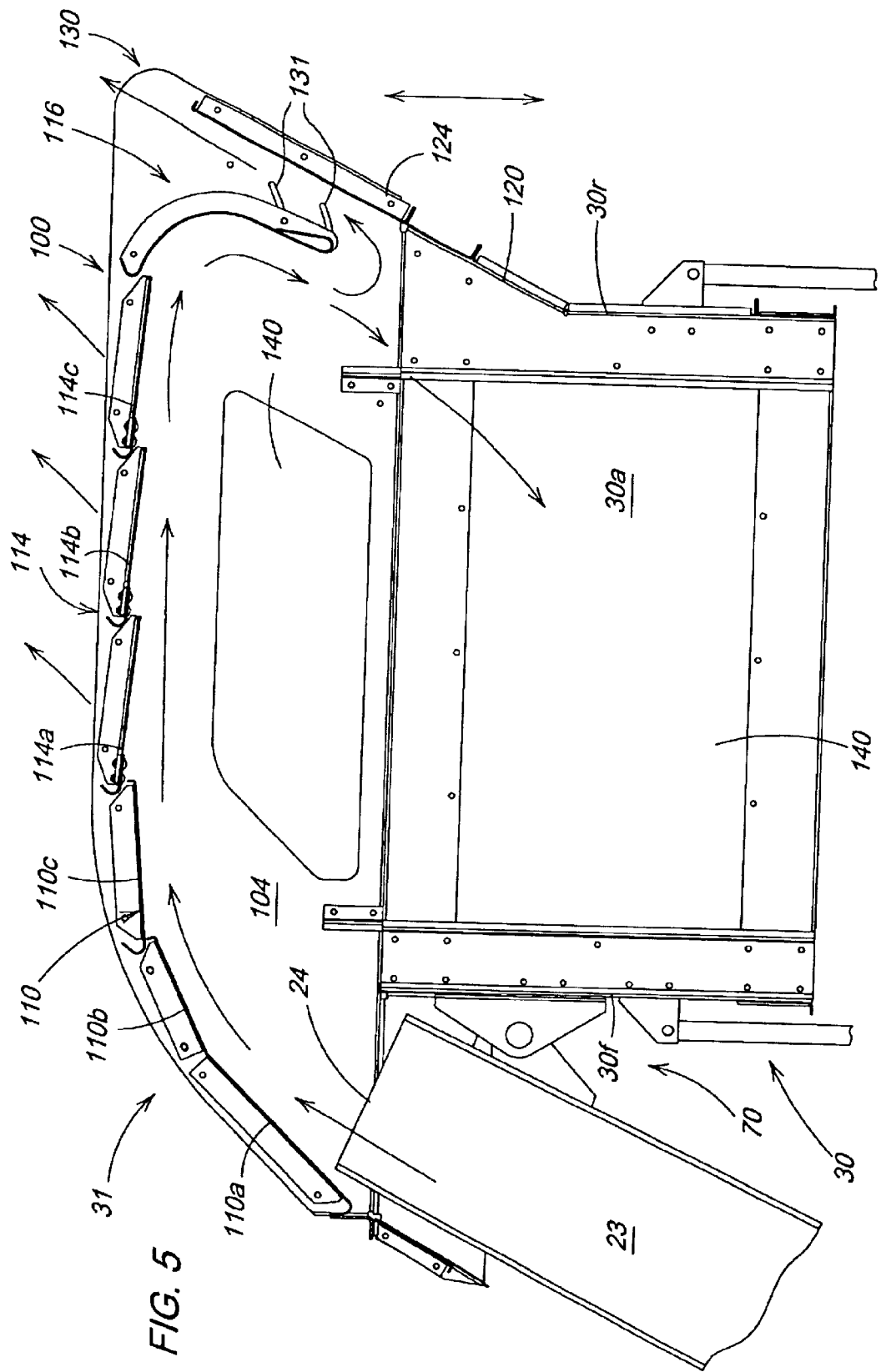

US 6,938,401 B2

SEPARATION HOOD FOR A COTTON HARVESTER

FIELD OF THE INVENTION

The present invention relates to hood structure for separating air and debris from cotton as harvested material is conveyed to a receptacle or accumulator.

BACKGROUND OF THE INVENTION

On self-propelled cotton harvesters, air is used to convey cotton from the picking units to the basket. Once the cotton enters the basket, the air is separated from the cotton so the cotton stays in the basket as the air exits the basket. On current picker designs, the cotton entry area to the basket includes separation structure such as finger grates to allow the air and fine trash to pass through while retaining the cotton. Side screens on the basket also allow excess air to pass out of the basket.

Previously available designs work well for large baskets which have a large surface area and relatively low cotton velocity rates across the grates and screens. However, if the basket or other receiving area has a smaller effective area there is less surface area to discharge the air, and relative air flow is increased. For example, the harvester shown in commonly assigned U.S. Pat. No. 6,263,650 COTTON HARVESTER WITH ACCUMULATOR includes a receptacle which has an effective area only a fraction of that of a conventional harvester wherein an air system directly feeds a large basket. With the smaller effective area, the air velocity increases through the grates and screens. Cotton often is forced through the openings which results in lost crop and blocked screens and grates which have to be cleaned periodically. In addition, the excess air will increase the pressure in a small volume basket or accumulator and reduce the air system performance. The excess air also causes adverse flow patterns which recirculate and blow cotton away from the intended destination.

In a harvester accumulator, the upper portion of the receiving area may require sloping wall structure diverging in a downward direction to feed the relatively small opening while providing sufficient hood separation area. Propelled cotton and debris can easily build up on the sloping wall structure and result in cotton dams and blockages that have to cleared.

BRIEF SUMMARY OF THE INVENTION

A hood receives a stream of material including a mix of cotton, air and debris from an air delivery system on a cotton harvester. A forward deflector directs the mixture towards the rear of a receptacle or accumulator. The deflected mixture passes under finger grates which retain cotton but allow some of the air and light trash to pass through out of the stream. A curved rear deflector forces the remaining mix downwardly towards the basket or accumulator and prevents build-up of material on sloping wall structure feeding a receiving area. Air and light debris at the bottom of the rear curved deflector change direction abruptly and exit through an upwardly directed air outlet at the back of the deflector. The momentum of the heavier cotton prevents cotton from making the tight turn around the bottom of the deflector and directs the cotton towards the receptacle or accumulator. Air and debris exit the hood away from the receptacle through the air outlet to thereby reduce air pressure and air turbulence in the receptacle. The increased air discharge area prevents pressure build-up in the receptacle for improved air system performance and improved cotton quality by allowing more of the light trash and dirt to be separated from the cotton prior to entry into the receptacle.

The curved deflector is adjustable and can be moved to a closed position in certain harvest conditions to prevent cotton loss through the outlet. The deflector continues to direct cotton towards the receiving area and helps prevent any material build-up on wall structure around the receiving area, particularly on sloped wall sections that lead into the lower portion of the accumulator.

BRIEF DESCRIPTION OF THE DRAWINGS

FIG. 5 is a view similar to FIG. 4 but with arrows showing the path of the cotton and debris.

DESCRIPTION OF THE PREFERRED EMBODIMENT

Figure 1:
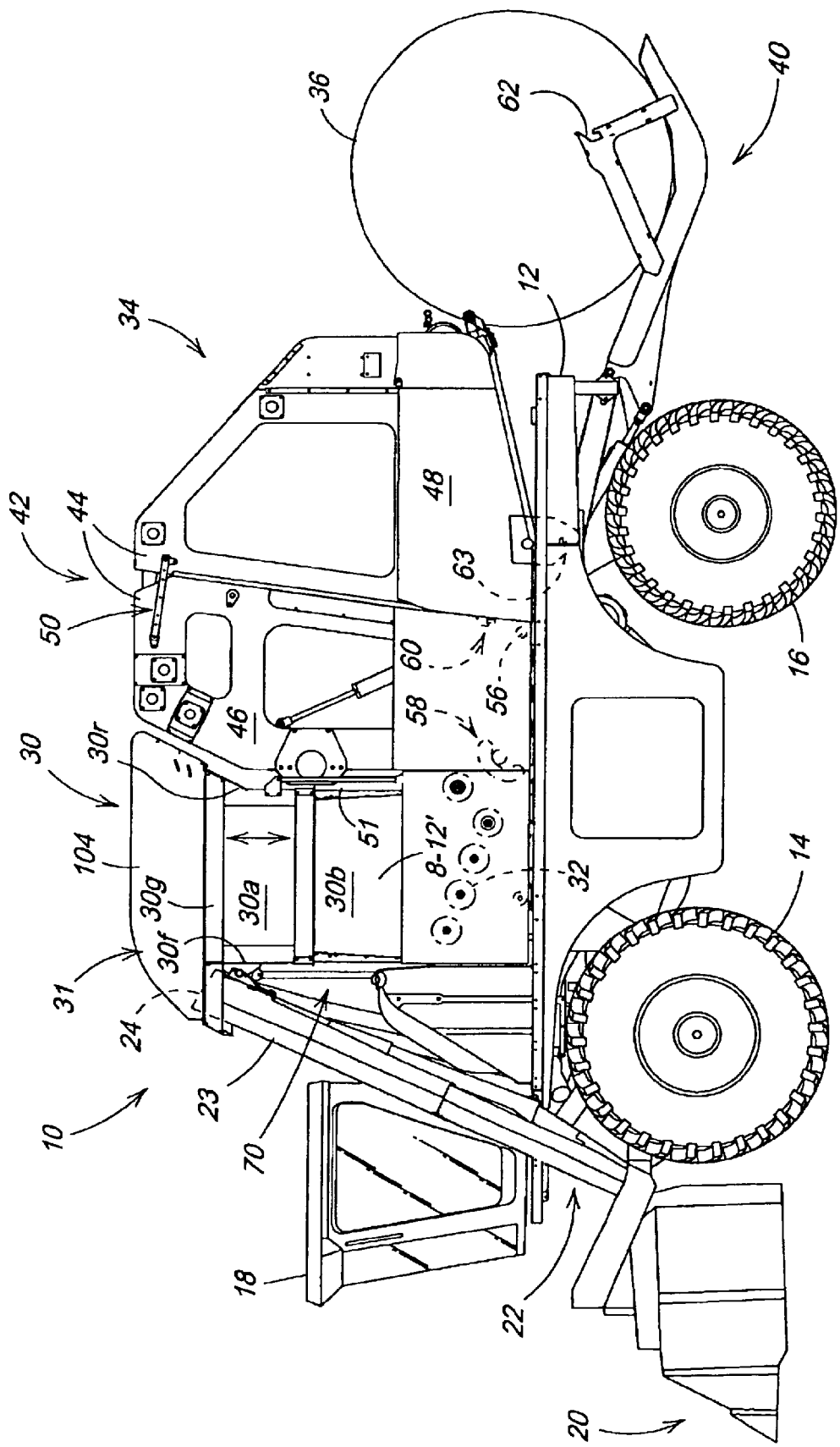
FIG. 1 is a side view of a cotton harvester with an on-board processor and a hood system located over a receptacle/accumulator.

Referring to FIG. 1 therein is shown a cotton harvester 10 having a main frame 12 supported for movement by forward drive wheels 14 and rear steerable wheels 16. A cab 18 is supported at the front end of the main frame 12 above forwardly mounted harvesting structure indicated at 20 which removes cotton from plants and directs the removed cotton into a telescoping air duct system 22 with ducts 23 having upwardly directed outlets 24

An upright telescoping accumulator system 30 includes an upper inlet or separating hood structure 31 and an opposite lower portion or metering floor 32. The accumulator system 30 is supported on the forward end of the frame 12 behind the cab 18 for receiving the cotton from the air duct system 22. A processor or module builder 34 is supported rearwardly of the accumulator system 30. The accumulator system 30 stores cotton as necessary to facilitate continuous harvesting, and the metering floor 32 distributes the cotton to the module builder 34 which first forms a mat of material and then rolls the mat into a compact round bale or module 36. The accumulator and processor system may be generally of the type shown and described in the commonly assigned U.S. Pat. No. 6,421,996 entitled Harvester with Bale Forming Chamber Having a Transport Mode and in our aforementioned co-pending application Ser. No.10/687,256 entitled Baler Gate Linkage and Latch Structure, filed 15 Oct. 2003.

A bale or module handling system 40 is located rearwardly of the processor 34 for receiving a formed bale or module 36 from the processor 34. The handling system 40 temporarily supports the module 36 (FIG. 1) for transport during field-working operations and then discharges it from the harvester 10 at the desired location in the field. The module builder 34 includes a baler 42 having a clamshell type of housing 44 having first and second (front and rear) upright or frame sections 46 and 48. The sections 46 and 48 are connected together by a control linkage structure 50. In a field-working position (FIG. 1), the top portions of the sections 46 and 48 are located at or slightly above the level of the top of the accumulator system 30 to establish a maximum working height of the harvester 10. The accumulator structure 30 has upper and lower telescoping sections 30a and 30b, and cylinders 51 on each side of the accumulator structure move the section 30a vertically (arrow of FIG. 1) between a raised operating position (FIG. 1) and a lowered transport position over the section 30b for transport and shipping. The sections 30a and 30b are rectangular in cross section with front and rear walls 30f and 30r connected by opposite side walls 30g, and the section 30a opens upwardly into the hood structure 31. By way of example, the upper section 30b is about twelve feet wide and the lower section 30a tapers to a width of approximately eight feet in the area of the metering floor 32. For a more detailed description of the telescoping accumulator structure, reference may be had to the aforementioned U.S. Pat. No. 6,263,650.

The module builder 34 includes a bale-forming chamber with a round baler belt and roller structure which receives material from the accumulator system 30 when the builder 34 is in the upright field-working position shown in FIG. 1. The baler structure 60 operates in a manner generally identical to that of a conventional round baler and rolls the material into a compact round bale. It is to be understood that various types of delivery systems for conveying the material to the baling device may be utilized with the present invention.

When a complete bale is formed, the rear or gate section 48 of the clamshell housing 44 is rocked rearwardly and upwardly to release the bale from the chamber onto the handling system 40 (FIG. 1). The accumulator system 30 facilitates continued operation of the harvester 10 while the bale 36 is released from the chamber. The handling system 40 is positioned to receive, support and transport the completed bale while the harvesting continues. When the desired location such as the end of the field is reached, the system 40 is activated to lower the bale 36 and release it from the harvester 10.

The front frame section 46 is pivotally connected to the harvester frame 12 by a pivot 56 for rocking between an upright field-working position (FIG. 1), a rearwardly and downwardly directed transport position, and a shipping position wherein the bale handler is at ground level. Hydraulically operated latch or securing structure 58 is mounted on the frame 12 and the lower forward portion of the front frame section 46 to lock the front frame section in an upright field-working position. Cylinder structure (not shown) located on each side of the baler includes a first end connected to the frame section 46 and a second end connected to the linkage structure 50.

With the front frame section 46 latched in the upright position and the cylinder structure fully retracted (FIG. 1), the sections 46 and 48 define the bale forming chamber extending upwardly from the harvester frame 12. The top of the chamber is approximately level with the top of the extended accumulator system 30. Automatically operable gate lock structure 60 supported by the frame sections 46 and 48 rearwardly adjacent the front frame pivot 56 latches the sections together as the bale forming chamber is closed during retraction of the cylinder structure. Upon initial activation of the cylinder structure to open the chamber, there is initial relative vertical motion of the sections 46 and 48 to release the gate lock structure 60.

To open the bale forming chamber, the cylinder structure is extended to initially release the gate lock structure 60 and then to rock the section 48 upwardly relative to the section 46 to open the housing and release the formed bale 36. The released bale 36 can then be carried by the harvester 10 (FIG. 1) to a convenient deposit area in the field while the harvesting operation continues uninterrupted. To move the housing 44 to the transport or the shipping position, the section 48 is rocked upwardly and the bale handling system 40 moved to the upright position. The cylinder structure is retracted to rock the section downwardly towards the closed position. However, hook structure 62 on the upright handling system 40 is in the path of travel of a mating member 63 the section 48 and latches to the section 48. Thereafter, the cylinder structure is put into a float condition. The latching structure 58 is operated to release the front frame section 46, and the handling system 40 is then moved downwardly. The sections 46 and 48 move downwardly primarily under the influence of gravity with the system 40. Since the section 48 is positively latched to the handing system 40 at 62 and 63, the system 40 can exert a pull on the sections if necessary.

The air duct system 22 is supported by a duct lift system indicated generally at 70 which can be retracted to telescope the ducts and move the uppermost duct outlets 24 to a position generally level with the top of the cab 18. The lift system can be of the type shown and described in copending and commonly assigned patent application Ser. No. 09/987,242 entitled DUCT SUPPORT AND TRANSITION STRUCTURE FOR A HARVESTER filed 13 Nov. 2001. The ducts 23, accumulator 30 and housing 44 can all be lowered to a level generally aligned with the top of the cab for transport or shipping.

The volume of the accumulator structure 30 is less than that of a conventional basket. The accumulator front to rear depth dimension is, as best seen in FIG. 1, only a fraction of the length of the frame 12 and of a corresponding fore-and-aft dimension on a typical basket. Therefore the amount of conveying air per unit storage volume that has to be released in the accumulator area is much more than with a conventional harvester with a full capacity basket.

Figure 2:
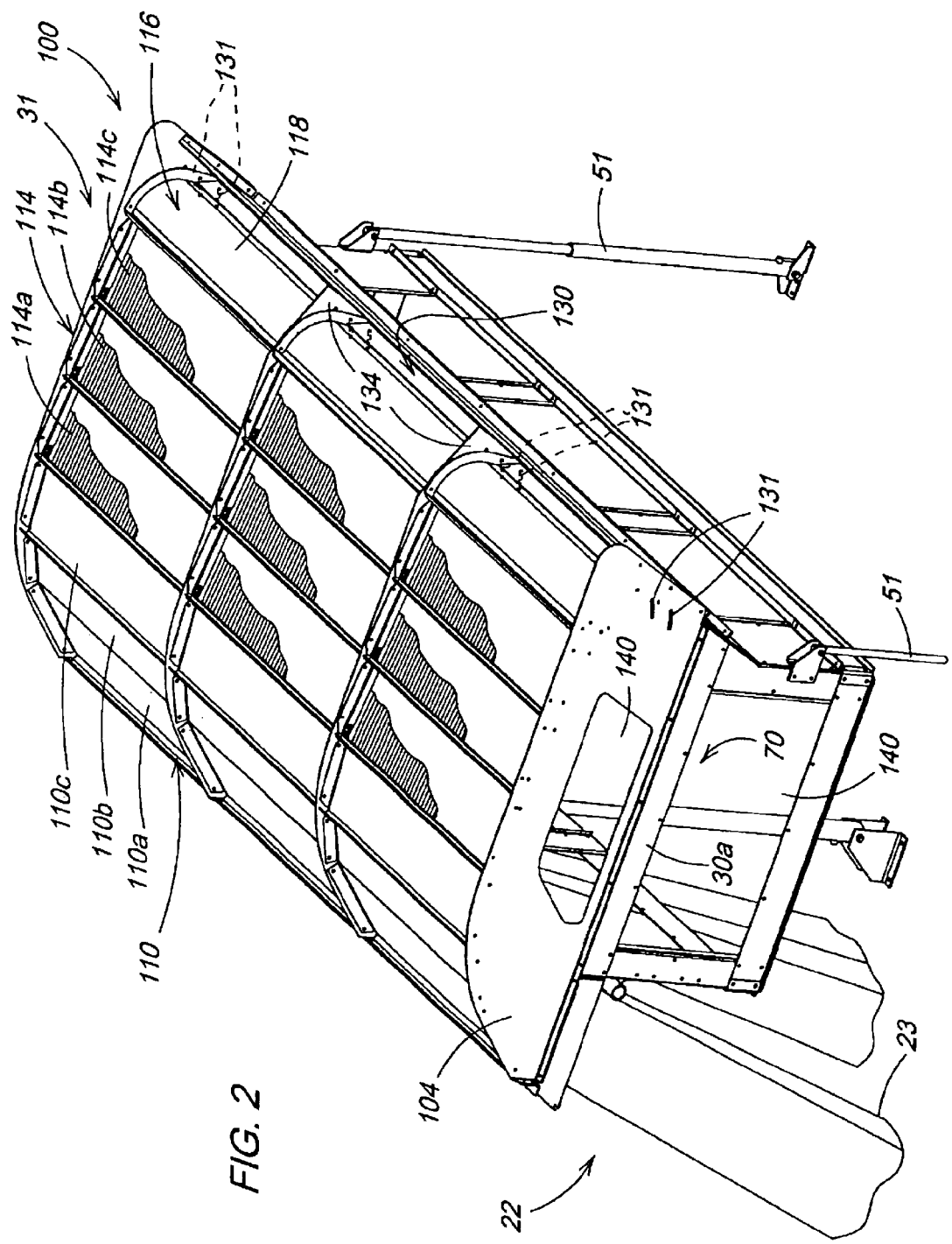
FIG. 2 is a right rear side perspective view of the hood structure on the harvester of FIG. 1.
Figure 3:
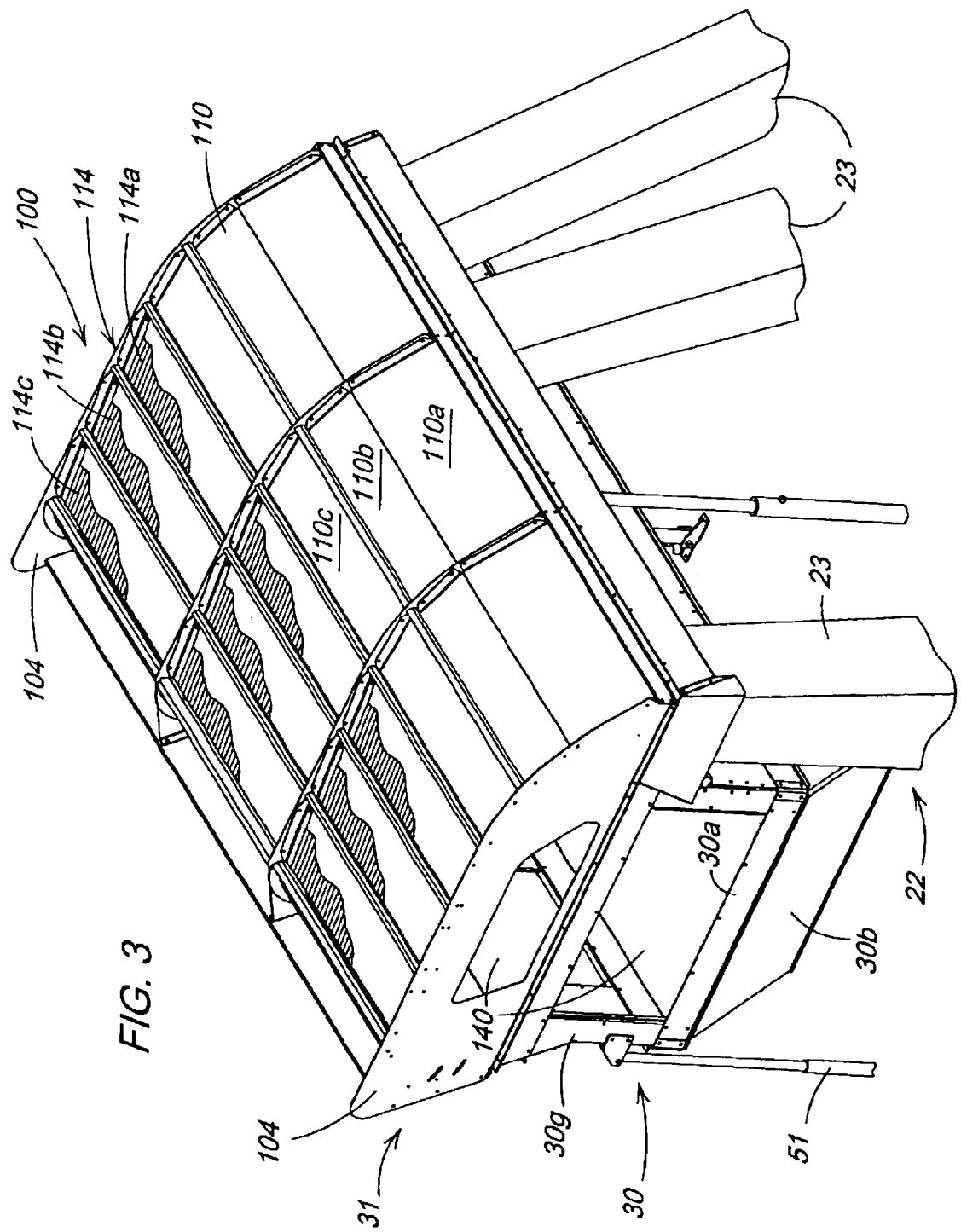
FIG. 3 is a left front side perspective view of the hood structure of FIG. 2.
Figure 4:
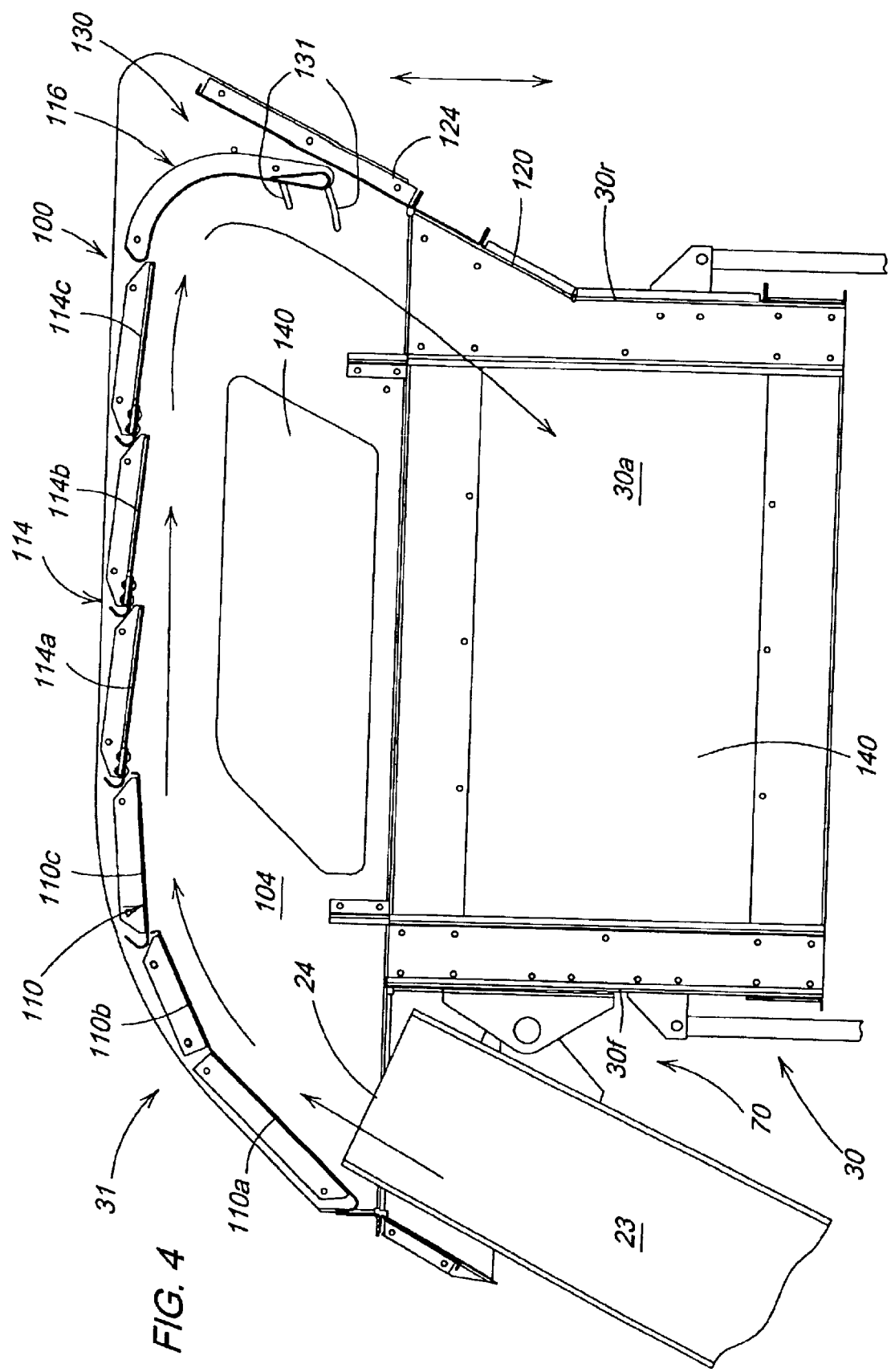
FIG. 4 is a side view, partially in section and with parts removed, of the hood structure and upper portions of the air system and accumulator.

To better handle the conveyed material over a relatively small open area of the accumulator and to separate dirt, debris and air from the cotton, the hood structure 31 is provided with a special deflector and grate structure 100 (FIGS. 2–4). The hood structure 31 extends completely over the open top of the section 30a and an air delivery system propels air, cotton and debris in a path generally horizontally towards the rear wall of the section 30a. Each duct outlet 24 opens upwardly and rearwardly towards a front deflector 110 which extends the width of the hood structure 30 between hood side walls 104. The deflector 110 and includes three rearwardly and upwardly angled panels 110a, 110b and 110c, and the rearmost panel 110c terminates rearwardly of the front wall of the section 30a.

Grate structure 114 extends horizontally from the rearmost panel 110c to a location above the rear wall of the section 30a. The grate structure 114 is shown as three finger grate panels 114a, 114b and 114c each having a row of fingers sloping slightly downwardly in the rearward direction. The fingers are spaced to allow air and small dirt and debris entrained in the conveyed material to escape through the top of the hood structure 31 while retaining the cotton within the hood structure.

A rear deflector 116 is supported near the top aft portion of the hood structure 31 between the side walls 104. As shown, the deflector 116 includes a forwardly concave panel 118 extending downwardly from the aft edge of the rear finger grate panel 114c and terminating forwardly and above a rearwardly angled, downwardly converging top portion 120 of the rear wall 30r. A rearwardly angled aft wall panel 124 offset behind the forwardly concave panel 118 extends between the side walls 104 of the hood structure 31 and defines an air and debris outlet 130 extending upwardly and rearwardly from the lowermost edge or extremity of the deflector 116. The rear deflector 116 is located in the material flow path downstream of the grate structure 114 for intercepting the propelled cotton and remaining air and debris that remain unseparated from the cotton after the material stream passes the grate structure 114. The outlet 130 is adjustable and opens behind the deflector 116 in a direction generally opposite to the direction of the steam of material at the concave face of the panel 118. The lower portion of the deflector 116 is supported in slots 131 in the side walls 104 and in fore-and-aft support plates 134 spaced between the side walls and is adjustable from a closed position generally blocking flow of material to a fully open position offset several inches forwardly of the aft wall panel 124.

The panel 118 deflects the cotton downwardly towards the open top of the section 30a of the accumulator system 30 and prevents build-up of material around the top portion 120 which converges downwardly into the accumulator. Air and light debris change direction abruptly at the bottom of the curved deflector panel 118 and exit through the outlet 130 at the back of the deflector 116 when the deflector is in an open position. The momentum of the heavier cotton prevents cotton from making the tight turn around the bottom of the deflector 116 and carries the cotton towards the receptacle. The increased air discharge area prevents pressure build-up in the receptacle for improved air system performance and improved cotton quality by allowing more of the light trash and dirt to be separated from the cotton prior to entry into the receptacle. In some conditions, the deflector may be moved to the closed position to prevent cotton loss through the outlet 130. The deflector 116 directs the propelled material towards the receiving area and prevents any build-up of material in areas around the input to the receiving area, such as around the diverging top portion 120. The walls of the accumulator structure 30 include openings 140 with screen (not shown) at locations 140 to provide additional release areas for air and debris.

Having described the preferred embodiment, it will become apparent that various modifications can be made without departing from the scope of the invention as defined in the accompanying claims.

What is claimed is:

1. Separation hood structure for a cotton harvester having an upright receptacle with upstream and downstream walls, a harvested material delivery system duct having a duct outlet adjacent the upstream wall, the duct propelling air, cotton and debris in a path from the upstream wall over the receptacle towards the downstream wall, the separation hood structure comprising a hood opening into the delivery system duct outlet and extending over the receptacle, the hood including a separation grate intercepting the propelled air, cotton and debris and facilitating removal of the air and debris from the cotton, the hood structure further including a rear deflector located above the downstream wall for intercepting the propelled cotton and remaining air and debris that is unseparated from the cotton and directing the cotton in a first direction into the receptacle, the deflector preventing build-up of harvested material on the walls, wherein the receptacle includes an upwardly opening top extending from the duct outlet to the downstream wall, and the hood structure opens downwardly into the top; and including an adjustable air outlet opening behind the rear deflector in a direction different from the first direction, the remaining air and debris exiting the hood away from the receptacle through the air outlet to thereby reduce air pressure and air turbulence in the receptacle, wherein momentum of cotton directs cotton into the receptacle as the remaining air and debris exit the hood.

2. The hood structure as set forth in claim 1 including a forward deflector located above the upstream wall, the forward deflector intercepting and directing cotton from the air delivery system towards the rear deflector.

3. The hood structure as set forth in claim 2 wherein the receptacle includes first and second side walls and the deflectors and grate extend between the first and second side walls.

4. Separation hood structure for a cotton harvester having an upright receptacle with upstream and downstream walls, a harvested material delivery system duct having a duct outlet adjacent the upstream wall, the duct propelling air, cotton and debris in a path from the upstream wall over the receptacle towards the downstream wall, the separation hood structure comprising a hood opening into the delivery system duct outlet and extending over the receptacle, the hood including a separation grate intercepting the propelled air, cotton and debris and facilitating removal of the air and debris from the cotton, the hood structure further including a rear deflector located above the downstream wall for intercepting the propelled cotton and remaining air and debris that is unseparated from the cotton and directing the cotton in a first direction into the receptacle, the deflector preventing build-up of harvested material on the walls, wherein the receptacle includes an upwardly opening top extending from the duct outlet to the downstream wall, and the hood structure opens downwardly into the top; and wherein the cotton harvester has a fore-and-aft extending frame extending a first distance rearwardly from a cab, and wherein the receptacle has a fore-and-aft dimension less than half the first distance and wherein the includes a lower cotton metering portion.

5. Separation hood structure for a cotton harvester having an upright receptacle with opposite first and second walls joined by side walls and opening upwardly, an air delivery system propelling air, cotton and debris in a path rearwardly from the first wall towards the second wall and between the side walls, the separation hood structure comprising a hood extending from the first wall to the second wall and opening into the air delivery system, the hood including grate structure facilitating separation of the air and debris from the cotton and away from the path, a forwardly concave rear deflector located in the path adjacent the second wall for intercepting the propelled cotton and remaining air and debris and directing the cotton in a first direction towards the receptacle, wherein the receptacle includes a sloping wall portion which diverges in a downward direction adjacent the rear deflector, the rear deflector facilitating removal of material from the sloping wall portion to prevent build-up on the sloping wall portion.

6. The hood structure as set forth in claim 5 wherein the grate structure extends horizontally from an area above the first wall generally continuously to an area above the second wall.

7. The hood structure as set forth in claim 5 wherein the rear deflector comprises a generally solid panel curving downwardly from the grate structure.

8. The hood structure as set forth in claim 5 wherein the rear deflector has a front face intercepting the propelled air, cotton and debris and an opposite face defining an outlet wall curving upwardly away from the receptacle and an outlet opening behind the rear deflector adjacent the second wall, wherein momentum of cotton directs the cotton into the receptacle, the remaining air and debris exiting the hood away from the receptacle through the outlet to thereby reduce air pressure and air turbulence in the receptacle.

9. Separation hood structure for a cotton harvester having an upright receptacle with front and rear walls, an air duct propelling harvest material including air, cotton and debris towards the receptacle, the separation hood structure located over the receptacle and comprising an input opening into the air duct, a forward deflector located adjacent the input for directing the harvest material rearwardly in a path towards the rear wall, grate structure located above the receptacle facilitating partial separation of the air and debris from the cotton as the harvest material moves rearwardly, a rear deflector located in the path adjacent the rear wall for intercepting the propelled cotton and remaining air and debris and directing the cotton downwardly towards the receptacle, the rear deflector preventing build-up of the harvest material on the walls; and wherein the rear deflector comprises a generally solid panel curving downwardly from the grate structure.

10. Separation hood structure for a cotton harvester having an upright receptacle with front and rear walls, an air duct propelling harvest material including air, cotton and debris towards the receptacle, the separation hood structure located over the receptacle and comprising an input opening into the air duct, a forward deflector located adjacent the input for directing the harvest material rearwardly in a path towards the rear wall, grate structure located above the receptacle facilitating partial separation of the air and debris from the cotton as the harvest material moves rearwardly, a rear deflector located in the path adjacent the rear wall for intercepting the propelled cotton and remaining air and debris and directing the cotton downwardly towards the receptacle, the rear deflector preventing build-up of the harvest material on the walls; and wherein the rear deflector has a front face intercepting the propelled air, cotton and debris and an opposite face defining an outlet wall curving upwardly away from the receptacle, the hood structure further comprising an air outlet opening behind the deflector adjacent the rear wall, wherein momentum of cotton directs the cotton into the receptacle, remaining air and debris exiting the hood away from the receptacle through the air outlet to thereby reduce air pressure and air turbulence in the receptacle.

11. The hood structure as set forth in claim 10 wherein the deflector includes a lower extremity around which direction of travel of the air and debris change.

12. The hood structure as set forth in claim 11 wherein the deflector is adjustable to vary area of the air outlet over a range of areas between a fully open position wherein the remaining air and debris exit the hood through the air outlet and a closed position generally preventing material from exiting through the air outlet.

13. Separation hood structure for a cotton harvester having an upright receptacle with front and rear walls, an air duct propelling harvest material including air, cotton and debris towards the receptacle, the separation hood structure located over the receptacle and comprising an input opening into the air duct, a forward deflector located adjacent the input for directing the harvest material rearwardly in a path towards the rear wall, grate structure located above the receptacle facilitating partial separation of the air and debris from the cotton as the harvest material moves rearwardly, a rear deflector located in the path adjacent the rear wall for intercepting the propelled cotton and remaining air and debris and directing the cotton downwardly towards the receptacle, the rear deflector preventing build-up of the harvest material on the walls; and wherein the front and rear walls include a sloped portion directing cotton towards inwardly into the receptacle, the rear deflector facilitating removal of harvest material from the sloped portion to prevent build-up of the harvest material adjacent the hood structure.

14. Separation hood structure for a cotton harvester having an upright receptacle with a front wall and a rear wall connected by side walls, an air duct propelling harvest material including air, cotton and debris through a duct outlet towards the receptacle, the separation hood structure located over the receptacle and opening downwardly over the duct outlet, a forward deflector located adjacent the duct output for directing the harvest material rearwardly in a path towards the rear wall, a rear deflector located in the path adjacent the rear wall for intercepting the propelled cotton and remaining air and debris and directing the cotton downwardly towards the receptacle, grate structure located above the receptacle between the forward deflector and the rear deflector and facilitating partial separation of the air and debris from the cotton as the harvest material moves towards the rear wall, the rear deflector preventing build-up of the harvest material on the rear wall, wherein the rear wall includes a sloped portion and wherein the rear deflector prevents the harvest material from building up on the sloped portion.

15. The hood structure as set forth in claim 14 wherein the path is generally horizontal between the forward deflector and the rear deflector.

16. Separation hood structure for a cotton harvester having an upright receptacle with a front wall and a rear wall connected by side walls, an air duct propelling harvest material including air, cotton and debris through a duct outlet towards the receptacle, the separation hood structure located over the receptacle and opening downwardly over the duct outlet, a forward deflector located adjacent the duct output for directing the harvest material rearwardly in a path towards the rear wall, a rear deflector located in the path adjacent the rear wall for intercepting the propelled cotton and remaining air and debris and directing the cotton downwardly towards the receptacle, grate structure located above the receptacle between the forward deflector and the rear deflector and facilitating partial separation of the air and debris from the cotton as the harvest material moves towards the rear wall, the rear deflector preventing build-up of the harvest material on the rear wall, wherein the rear wall includes a wall portion angled forwardly in the downward direction at a location adjacent the rear deflector, the rear deflector assisting the movement of the harvest material over the angled wall portion.

* * * * *